United States Patent
Birk et al.

(10) Patent No.: US 6,785,600 B2
(45) Date of Patent: Aug. 31, 2004

(54) METHOD FOR OPERATING AN INTERNAL COMBUSTION ENGINE

(75) Inventors: Manfred Birk, Oberriexingen (DE); Andreas Michalske, Leonberg (DE); Dirk Samuelsen, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 87 days.

(21) Appl. No.: 10/009,423

(22) PCT Filed: Mar. 17, 2001

(86) PCT No.: PCT/DE01/01033
§ 371 (c)(1),
(2), (4) Date: Apr. 18, 2002

(87) PCT Pub. No.: WO01/77508
PCT Pub. Date: Oct. 18, 2001

(65) Prior Publication Data
US 2002/0134351 A1 Sep. 26, 2002

(30) Foreign Application Priority Data
Apr. 8, 2000 (DE) ........................................ 100 17 545

(51) Int. Cl.⁷ .......................... F02D 41/04; G06F 19/00
(52) U.S. Cl. ...................... 701/104; 123/295; 123/436; 701/111; 701/115
(58) Field of Search ................................ 123/295, 305, 123/478, 480, 481, 486, 492, 493, 436, 435; 701/101, 102, 103, 104, 105, 110, 109, 111, 115; 60/284, 285

(56) References Cited

U.S. PATENT DOCUMENTS

| | | | | |
|---|---|---|---|---|
| 5,752,485 A | 5/1998 | Minowa et al. | ............. | 123/399 |
| 5,988,137 A | * 11/1999 | Tamura et al. | ............. | 123/295 |
| 6,209,526 B1 | * 4/2001 | Sun et al. | .................... | 123/295 |
| 6,302,081 B1 | * 10/2001 | Moser et al. | ................ | 123/295 |
| 6,345,607 B1 | * 2/2002 | Ozaki et al. | ................ | 123/486 |
| 6,446,596 B1 | * 9/2002 | Moser et al. | ................ | 123/295 |
| 6,539,914 B1 | * 4/2003 | Moser et al. | ................ | 123/295 |

FOREIGN PATENT DOCUMENTS

| | | |
|---|---|---|
| DE | 44 45 684 | 6/1996 |
| DE | 197 44 409 | 4/1999 |
| DE | 198 13 377 | 10/1999 |
| JP | 63 248 954 | 10/1988 |
| JP | 05 001 609 | 1/1993 |
| JP | 08 319 862 | 12/1996 |

\* cited by examiner

*Primary Examiner*—Willis R. Wolfe
(74) *Attorney, Agent, or Firm*—Kenyon & Kenyon

(57) ABSTRACT

An internal combustion engine, in particular for a motor vehicle, is described. The internal combustion engine is provided with a control unit for determining a setpoint fuel mass and/or a setpoint air mass as a function of a setpoint torque. The control unit is also provided for transitioning from a first operating mode to a second operating mode of the internal combustion engine. An actual torque is determined by the control unit during the transition to the second operating mode of the internal combustion engine. A torque difference between the setpoint torque and the actual torque is also calculated by the control unit. Finally, the setpoint fuel mass and/or the setpoint air mass is controlled by the control unit as a function of the torque difference.

20 Claims, 1 Drawing Sheet

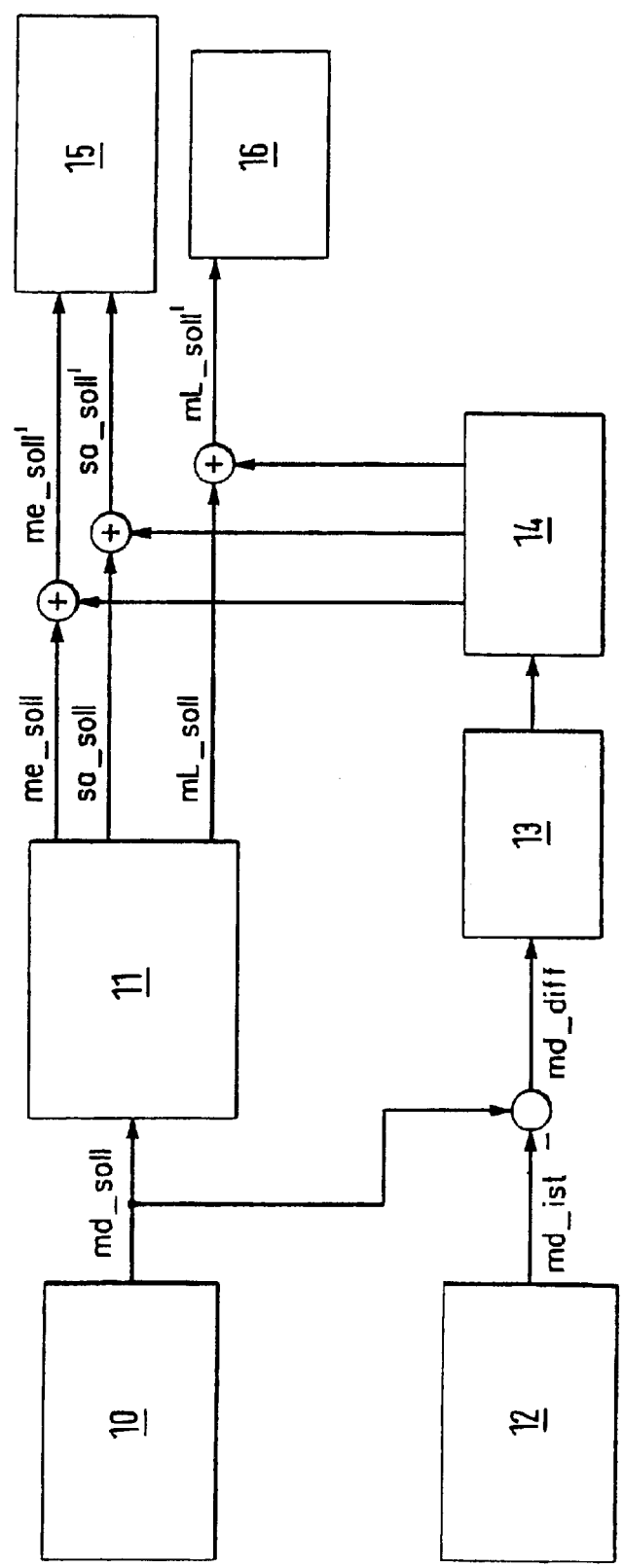

METHOD FOR OPERATING AN INTERNAL COMBUSTION ENGINE

FIELD OF THE INVENTION

The present invention relates to a method for operating an internal combustion engine, in particular of a motor vehicle, in which a setpoint fuel mass and/or a setpoint air mass is/are determined as a function of a setpoint torque, and in which a transition is made from a first operating mode to a second operating mode of the internal combustion engine. The present invention also relates to a corresponding internal combustion engine as well as to a corresponding control unit for an internal combustion engine.

BACKGROUND INFORMATION

In the case of gasoline engines as well as diesel gasoline engines, it is known to use so-called adsorption catalysts to reduce nitrogen oxides ($NO_x$) produced during combustion. These adsorption catalysts are suitable for temporarily storing the nitrogen oxides, particularly during a first lean operating mode of the internal combustion engine, in order to then release them again and reduce them in a subsequent second rich operating mode of the internal combustion engine. This transition to the rich operating mode necessary for regenerating the adsorption catalyst represents a problem. In particular, it must be ensured that this transition is carried out smoothly. Therefore, during the transition, the actual torque of the internal combustion engine may not or may only slightly deviate from the setpoint torque.

The actual torque can be measured with the aid of a torque sensor. It is also known in accordance with German Published Patent Application No. 44 45 684 to determine the actual torque as a function of the rotational speed of the internal combustion engine.

SUMMARY OF THE INVENTION

It is an object of the present invention to create a method for operating an internal combustion engine, which enables a smooth transition to the second operating mode of the internal combustion engine and, thus, to the regeneration of the adsorption catalyst.

According to the present invention, in the case of a method of the species cited at the outset, this object is achieved in that an actual torque is determined during the transition to the second operating mode of the internal combustion engine, a torque difference between the setpoint torque and the actual torque is calculated, and in that the setpoint fuel mass and/or the setpoint air mass is/are controlled as a function of the torque difference.

As mentioned, determining the setpoint fuel mass and/or setpoint air mass as a function of the setpoint torque can lead to comfort problems during the transition to the regeneration of the adsorption catalyst. In this context, the comfort problems are the result of the actual torque deviating from the desired setpoint torque. Such a deviation is detected by comparing the actual torque and the setpoint torque in accordance with the present invention. According to the present invention, the indicated torque difference is limited to a minimum by subsequently influencing the setpoint fuel mass and/or the setpoint air mass as a function of the determined torque difference. Finally, the present invention makes it possible to immediately detect any deviations in torque and to take appropriate countermeasures. The torque deviations can, thus, be kept to a minimum. At the same time, this represents an increase in comfort during the transition to the rich operating mode of the internal combustion engine and, thus, during the regeneration of the adsorption catalyst.

In this context, it is significant that a torque sensor is not required for determining the torque difference in accordance with the present invention. Instead, as already mentioned, it is also possible to derive the actual torque from the rotational speed of the internal combustion engine, as an absolute quantity. Thus, no additional sensor or the like is needed to carry out the present invention. At the same time, this represents a reduction in cost and constructive effort.

It is particularly advantageous when the actual torque is determined from the rotational speed of the internal combustion engine, as a relative quantity. If the setpoint torque is also determined as a relative quantity, comparing these two quantities yields the same result as comparing the corresponding absolute quantities. However, using the relative quantities results, in particular, in the significant advantage that the change in the actual torque can be easily derived from the change in the rotational speed of the internal combustion engine.

It is particularly advantageous when the torque difference is adjusted to zero by a controller. Using such a controller makes it possible to achieve optimum driving comfort. With the aid of the controller, jolting during the transition to the regeneration of the adsorption catalyst can be completely prevented.

In an advantageous embodiment of the present invention, the setpoint fuel mass and/or the setpoint air mass is/are controlled by the torque difference using a controller action model. In this manner, it is taken into consideration that the method of the present invention is essentially only used during the transition to the rich operating mode of the internal combustion engine and, thus, during the transition to the regeneration of the adsorption catalyst. It is possible via the controller action model to reliably prevent any losses of comfort due to jolting or the like when transitioning to the regeneration of the adsorption catalyst.

In an advantageous further refinement of the present invention, the setpoint fuel mass and/or the setpoint air mass is/are controlled by a control system as a function of a setpoint torque. This means that during normal operation of the internal combustion engine, the setpoint fuel mass and/or the setpoint air mass is/are not regulated, but is/are only controlled as a function of the setpoint torque. This forward control is generally completely sufficient during a lean operating mode of the internal combustion engine. Only during a rich operating mode of the internal combustion engine, i.e., during the regeneration of the adsorption catalyst among other things, this control can lead to inaccuracies and, thus, to torque deviations as explained at the outset. These torque deviations can then also be compensated for or corrected by the present invention.

In a particularly advantageous embodiment of the present invention, instead of the setpoint fuel mass and/or the setpoint air mass, the setpoint injection interval between a first partial injection and a second partial injection is controlled as a function of the torque difference.

This embodiment of the present invention is particularly advantageous especially when the fuel/air mixture supplied to the combustion chamber of the internal combustion engine already has the desired lambda. Changing the setpoint injection interval between the first and the second partial injection does not change this lambda. Instead, changing the setpoint injection interval only affects the actual torque generated by the internal combustion engine. In this particularly advantageous manner, the actual torque can be easily adapted to the setpoint torque without thereby changing the lambda of the internal combustion engine and, thus, the exhaust-gas composition of the internal combustion engine.

Particularly significant is the implementation of the method of the present invention in the form of a control element provided for a control unit of an internal combustion engine, in particular of a motor vehicle. In this context, a program that can be executed on a computing element, in particular on a microprocessor, and is suitable for carrying out the method according to the present invention is stored on the control element. Thus, in this case, the present invention is implemented by a program stored on the control element, so that this control element provided with the program represents the present invention in the same manner as the method for whose implementation the program is suited. In particular, an electrical storage medium, e.g., a read only memory or a flash memory, can be used as the control element.

BRIEF DESCRIPTION OF THE DRAWING

The FIGURE shows a schematic block diagram of an exemplary embodiment of the method according to the present invention.

DETAILED DESCRIPTION

In the block diagram of the FIGURE, a driver's command 10 is presupposed. This driver's command can be input by the driver of the motor vehicle with the aid of an accelerator, for example. The output signal of driver's command 10 is a setpoint torque md_soll.

Setpoint torque md_soll is then supplied to a torque control 11. This torque control 11 calculates a setpoint fuel mass me_soll as well as a setpoint air mass mL_soll on the basis of setpoint torque md_soll.

If the internal combustion engine is operated in a lean operating mode, i.e., the lambda is greater than 1, the torque actually produced by the internal combustion engine is substantially only dependent on the injected fuel mass. The air mass supplied to the internal combustion engine and the resulting charging of the combustion chamber of the internal combustion engine have almost no significance during the lean operation of the engine. In this respect, it is sufficient during a lean operating mode of the internal combustion engine to control the setpoint fuel mass me_soll and the setpoint air mass mL_soll with the aid of torque control 11.

However, during a rich operating mode of the internal combustion engine, i.e., when lambda is less than 1, the air mass supplied to the internal combustion engine and, thus, the charge in the combustion chamber of the internal combustion engine play a fundamental role. In general, this effect on the air mass during the rich operating mode of the internal combustion engine can be taken into consideration by appropriate model calculations. However, since the actual air mass supplied to the combustion chamber is not precisely known, there is the possibility that desired setpoint torque md_soll does not result from setpoint fuel mass me_soll and setpoint air mass mL_soll calculated by torque control 11. That can lead to torque fluctuations or to jerking particularly during a transition to the rich operating mode of the internal combustion engine.

Actual torque md_ist of the internal combustion engine is then determined with the aid of a torque determination 12. For this purpose, it is possible that a torque sensor be provided that measures the actual torque md_ist generated by the internal combustion engine. However, it is especially advantageous to derive actual torque md_ist of the internal combustion engine from the rotational speed of the internal combustion engine.

According to the present invention, setpoint torque md_soll and actual torque md_ist are compared to one another. The resulting torque difference md_diff is supplied to a controller 13. This controller 13 is configured such that torque difference md_diff between setpoint torque md_soll and actual torque md_ist becomes zero.

The output signal of controller 13 is supplied to a controller action model 14. Output quantities are generated by this controller action model 14 that are then cumulatively combined with setpoint fuel mass me_soll and setpoint air mass mL_soll.

The internal combustion engine is then controlled by this corrected setpoint fuel mass me_soll' and this corrected setpoint air mass mL_soll'. In the exemplary embodiment of the figure, this is achieved in that corrected setpoint fuel mass me_soll' is supplied to a metering device 15 for injection, and corrected setpoint air mass mL_soll' is supplied to an exhaust-gas recirculation 16.

By forming corrected setpoint fuel mass me_soll' and corrected setpoint air mass mL_soll', i.e., as a result of the action of controller 13 and controller action 14, it is achieved that torque difference md_diff between setpoint torque md_soll and actual torque md_ist is limited to a minimum or is adjusted to zero. Any jerking or other comfort losses due to torque fluctuations are, thus, prevented.

As mentioned, such comfort losses can occur, in particular, during a transition to the rich operating mode of the internal combustion engine. Thus, the explained method, i.e., the action via controller 13 and controller action 14, is intended preferably for the transition to the rich operating mode and, if applicable, during the rich operating mode of the internal combustion engine. In this context, such a rich operating mode of the internal combustion engine can preferably be used to regenerate an adsorption catalyst of the internal combustion engine.

Controller action 14 does not necessarily have to act in a correcting manner on both signals, i.e., on setpoint fuel mass me_soll and setpoint air mass mL_soll. Instead, it is also possible that the controller action only acts on setpoint fuel mass me_soll and leaves setpoint air mass mL_soll unchanged. Of course, a reverse procedure is also possible.

If metering device 15 is suitable for injecting the fuel into the combustion chamber of the internal combustion engine in two consecutive partial injections, a setpoint injection interval sa_soll is specified by torque control 11. This setpoint injection interval sa_soll can then be changed by controller action 14 to a corrected setpoint injection interval sa_soll'. Corrected setpoint injection interval sa_soll' is then finally supplied to metering device 15 for the injection.

Changing setpoint injection interval sa_soll does not change the mixture composition in the combustion chamber of the internal combustion engine. The supplied fuel mass and the supplied air mass remain the same. Thus, the corresponding lambda of the internal combustion engine also remains the same.

However, it is possible by changing the setpoint injection interval to change the torque generated by the internal combustion engine, i.e., actual torque md_ist. Thus, actual torque md_ist can be controlled by controller action 14 using the correction of setpoint injection interval sa_soll, without thereby changing the lambda of the internal combustion engine.

It is also possible for controller action 14 to correct setpoint injection interval sa_soll completely independently of any control of setpoint fuel mass me_soll and/or setpoint air mass mL_soll. It is even particularly advantageous when controller 13 only corrects setpoint injection interval sa_soll via controller action 14 without changing setpoint fuel mass me_soll or setpoint air mass mL_soll.

In the above-described exemplary embodiment, setpoint torque md_soll and actual torque md_ist are represented as absolute quantities. This can require too much effort especially in the context of deriving actual torque md_from the rotational speed of the internal combustion engine.

Alternatively, it is, therefore, possible to process setpoint torque md_soll and actual torque md_ist as relative quantities.

For this purpose, a setpoint start torque md_soll_0 is determined and stored at the onset of a regeneration, i.e., directly at the start of the transition to the rich operating mode of the internal combustion engine. After that, only setpoint torque changes delta_md_soll of setpoint torque md_soll with respect to this setpoint start torque md___0 are calculated using the equation Delta_md_ist=md_ist−md_ist_0.

Accordingly, an actual start torque md_ist_start is determined and stored at the start of the transition to the regeneration. After that, only actual torque changes delta_md_ist with respect to this actual start torque are calculated using the equation Delta_md_ist=md_ist−md_ist_0.

In this context, the aforementioned actual torque changes delta md_ist can be determined in a significantly simpler manner from changes in the rotational speed of the internal combustion engine.

It can also be provided that the relative quantities explained above are also used for regulating the internal combustion engine, i.e., the torque difference is corrected via the relative quantities, for example.

What is claimed is:

1. A control unit for an internal combustion engine, comprising:
   an arrangement for determining at least one of a setpoint fuel mass and a setpoint air mass as a function of a setpoint torque;
   an arrangement for making a transition from a first operating mode of the internal combustion engine to a second operating mode of the internal combustion engine;
   an arrangement for determining an actual torque during the transition to the second operating mode;
   an arrangement for calculating a torque difference between the setpoint torque and the actual torque; and
   an arrangement for controlling at least one of the setpoint fuel mass and the setpoint air mass as a function of the torque difference.

2. The control unit according to claim 1, wherein:
   the internal combustion engine is arranged in a motor vehicle.

3. A control element for a control unit of an internal combustion engine, the control element storing a computer program that when executed causes a computing device to perform the steps of:
   determining at least one of a setpoint fuel mass and a setpoint air mass as a function of a setpoint torque;
   making a transition from a first operating mode of the internal combustion engine to a second operating mode of the internal combustion engine;
   determining an actual torque during the transition to the second operating mode;
   calculating a torque difference between the setpoint torque and the actual torque; and
   controlling at least one of the setpoint fuel mass and the setpoint air mass as a function of the torque difference.

4. The control element according to claim 3, wherein:
   the control element includes one of a read-only memory and a flash memory.

5. The control element according to claim 3, wherein:
   the internal combustion engine is arranged in a motor vehicle.

6. The control element according to claim 3, wherein:
   the computing device includes a microprocessor.

7. An internal combustion engine, comprising:
   a control unit, including:
      an arrangement for determining at least one of a setpoint fuel mass and a setpoint air mass as a function of a setpoint torque;
      an arrangement for making a transition from a first operating mode of the internal combustion engine to a second operating mode of the internal combustion engine;
      an arrangement for determining an actual torque during the transition to the second operating mode;
      an arrangement for calculating a torque difference between the setpoint torque and the actual torque; and
      an arrangement for controlling at least one of the setpoint fuel mass and the setpoint air mass as a function of the torque difference.

8. The internal combustion engine according to claim 7, wherein:
   the internal combustion engine is arranged in a motor vehicle.

9. The internal combustion engine according to claim 7, wherein:
   during the transition from the first operating mode to the second operating mode a desired lambda value for an exhaust-gas composition of the internal combustion engine is maintained.

10. The internal combustion engine according to claim 7, wherein:
    the setpoint torque is an output signal from a driver command.

11. The internal combustion engine according to claim 10, wherein:
    the driver command includes an input made by a driver with the aid of an accelerator.

12. A method for operating an internal combustion engine, comprising the steps of:
    determining at least one of a setpoint fuel mass and a setpoint air mass as a function of a setpoint torque;
    making a transition from a first operating mode of the internal combustion engine to a second operating mode of the internal combustion engine;
    determining an actual torque during the transition to the second operating mode;
    calculating a torque difference between the setpoint torque and the actual torque; and
    controlling at least one of the setpoint fuel mass and the setpoint air mass as a function of the torque difference.

13. The method according to claim 12, wherein:
    the internal combustion engine is arranged in a motor vehicle.

14. The method according to claim 12, wherein:
the actual torque is determined from a rotational speed of the internal combustion engine as an absolute quantity.

15. The method according to claim 12, wherein:
the actual torque is determined from a rotational speed of the internal combustion engine as a relative quantity.

16. The method according to claim 12, further comprising the step of:
causing a controller to adjust the torque difference to zero.

17. The method according to claim 12, wherein:
at least one of the setpoint fuel mass and the setpoint air mass is controlled by the torque difference in accordance with a controller action model.

18. The method according to claim 12, wherein:
the second operating mode is a rich operating mode, and with the transition to the rich operating mode of the internal combustion engine, a transition is made to a regeneration of an adsorption catalyst.

19. The method according to claim 12, further comprising the step of:
causing a control system to control at least one of the setpoint fuel mass and the setpoint air mass as a function of the setpoint torque.

20. The method according to claim 12, further comprising the step of:
instead of controlling at least one of the setpoint fuel mass and the setpoint air mass, controlling a setpoint injection interval between a first partial injection and a second partial injection as a function of the torque difference.

* * * * *